Aug. 27, 1929.　　　J. R. WOOD　　　1,725,839
MOLDING MACHINE
Filed Feb. 4, 1926　　　2 Sheets-Sheet 1
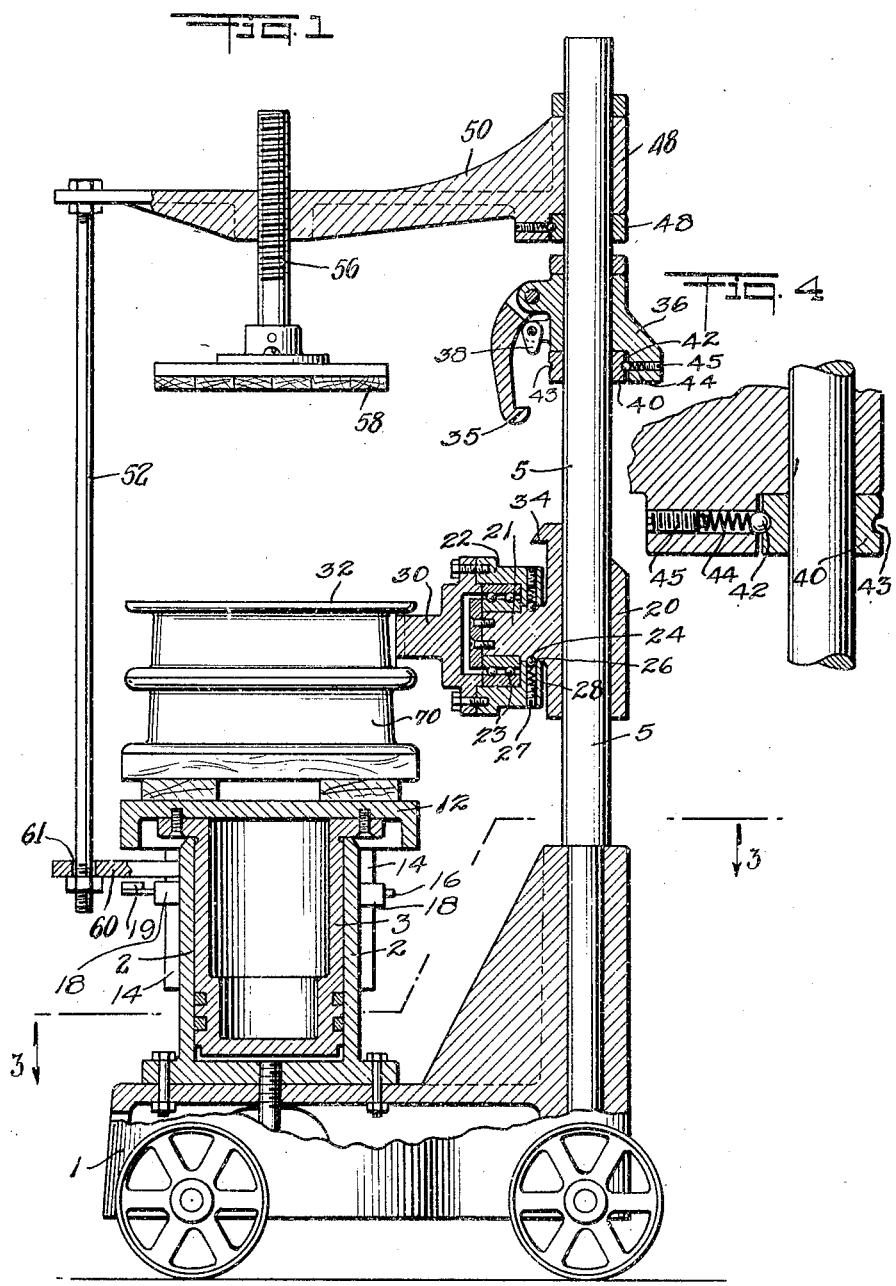
INVENTOR
John R. Wood
BY Cooper, Kerr &
Dunham, his ATTORNEYS

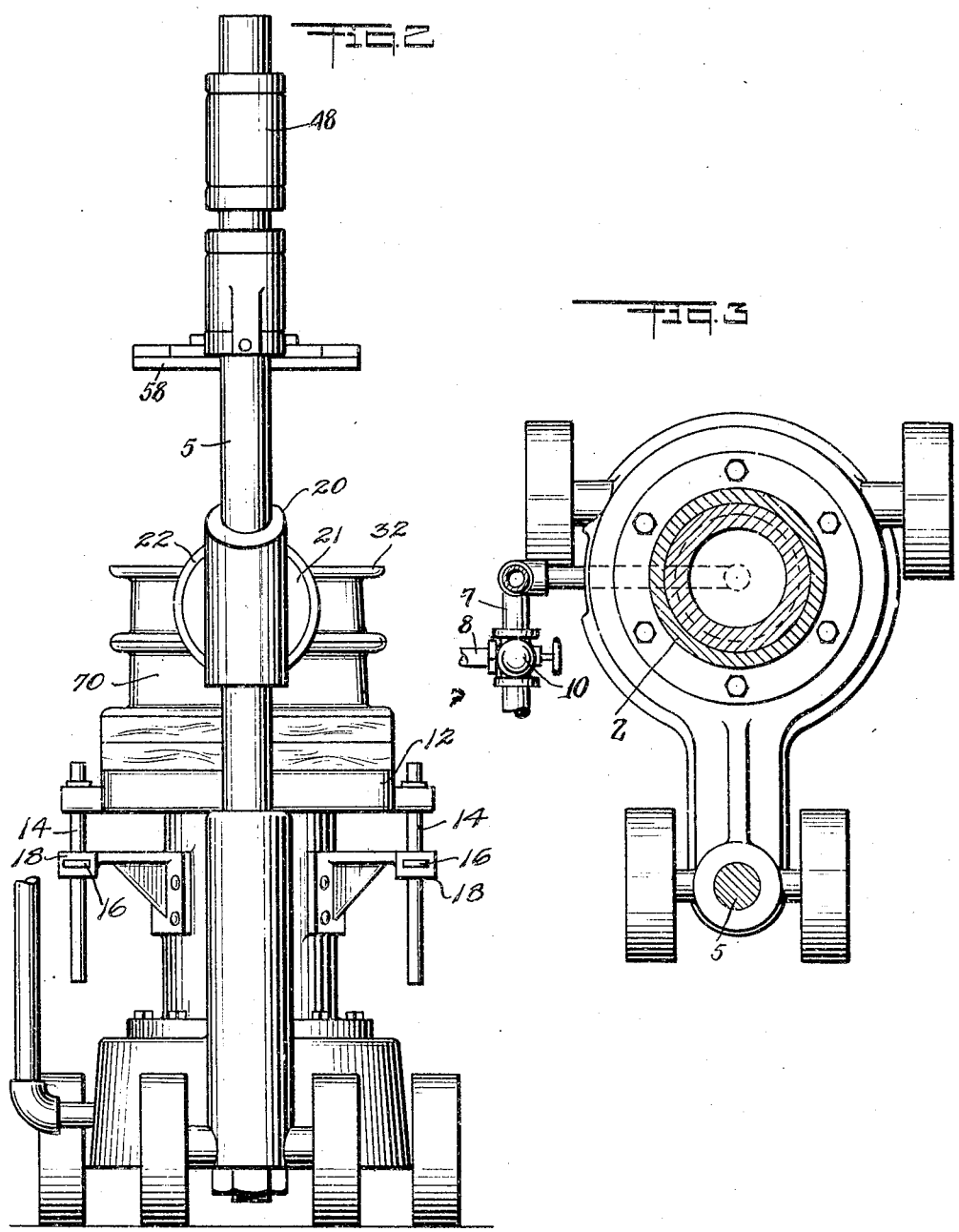

Patented Aug. 27, 1929.

1,725,839

UNITED STATES PATENT OFFICE.

JOHN R. WOOD, OF HATBORO, PENNSYLVANIA, ASSIGNOR TO NEW PROCESS MULTI-CASTINGS COMPANY, INCORPORATED, OF NEWARK, NEW JERSEY, A CORPORATION OF NEW JERSEY.

MOLDING MACHINE.

Application filed February 4, 1926. Serial No. 85,868.

My present invention relates to method and means for making casting molds of sand and the like in a flask and for relieving the flask of the mold for the immediate formation of another mold therein.

The invention further relates to a mold forming machine in which flask parts are mounted in a predetermined position on a match plate and with which successive mold parts are formed uniformly.

In the drawings in which are illustrated a molding machine embodying my invention:

Fig. 1 is a vertical midsection view showing the piston and cylinder of a hydraulic or air press, a cylindrical column with a flask mounted to a slide thereon and mounting between the slide and flask for rotational movement about a horizontal axis, a ramming head, and means for locking the said slide at a distance above its lowermost position, Fig 2 is a back elevation view of the machine of Fig. 1, Fig. 3 is a plan view in section thereof, Fig. 4 is a vertical sectional view of details of a slide connection between the column of the machine and ram supporting means.

In the drawings the base 1 supports at its front side the cylinder 2 and the piston 3 which operates therein and at its rear it supports the cylindrical column 5. The pipe 7 carries air to and from the cylinder 2, the pipe 8 connects pipe 7 to a source of air pressure not shown, and the valve 10 is adapted in one position to admit air under pressure from pipe 8 to pipe 7 and in another position to close pipe 8 and open pipe 7.

To the piston 3 is fixed the table 12 to which are fixed the depending fins 14, 14 two on each side thereof which extend in the lowered position of the ram through holes in the slides 16, 16 which are slidable in the guideways 18, 18 mounted to the sides of cylinder 2. The bar 19 connects the two slides and serves as a handle when the table is raised and pins 14, 14 are out of them to move them so that the holes therein are out of registry with the ends of said pins whereby when the table is lowered the ends of the pins will rest on the slides and the table will be supported at a raised position.

On the column 5 the slide 20 has a horizontal post 21 which carries the rotating head 22, the ball bearings 23 serving to impart ease of movement thereto and the balls 24, 24 held in the annular groove 26 by the set screws 27, 27 and springs 28, 28 serve to hold said head 22 in position on post 21. To said head 22 is mounted the horizontal arm 30 which carries the cope flask 32. At the upper end of slide 20 is formed the hook 34 which is adapted to cooperate with the hook 35 which is pivoted to the slide 36 mounted on column 5 at a point near its top. A cam 38 and a handle therefor not shown serve to disengage hooks 34 and 35 when desired. A ring 40 disengageably fixed to column 5 as by a set screw not shown serves to hold slide 36 in place thereon on the ball 42 held in the annular groove 43 by the spring 44 and set screw 45 serves to hold slide 36 and hook 35 against vertical movement on column 5 while permitting them to rotate thereabout.

A ring 48 similar to ring 40 holds the arm 50 in position on column 5 and this ring 48 together with the rod 52 which connects the outer end of arm 50 to the arm 60 fixed to cylinder 2 serve to hold arm 50 against upward movement. To arm 50 is mounted by the screw 56 the squeeze head 58 positioned above cope 32 and table 12. Said rod 52 disengageably connects with said cylinder 2 through the arm 60 which has an open ended slot 61 therein into and out of which rod 52 may be moved as it is rotated with arm 50 on post 5. Through this disengageable connection rod 52 and squeeze head 58 may be easily moved out of the way of the operator when their use is not required and as easily moved back into operating position when required.

In the use and operation of the machine above described for making molds the flask comprising the cope 32 and the drag 70 and a pattern plate are mounted together with the flask in the inverted position on table 12. Mold material is then sifted into the drag and valve 10 opened to raise table 12 and the flask whereby the flask mold is rammed against the head 58. A bottom board is then clamped over the drag and the table is lowered whereupon hooks 34 and 35 become engaged and hold the flask suspended over the table and free from both the table and the head 58.

The flask is then rotated on the head 22 to bring the cope uppermost whereupon the table is again raised to engage the flask, hooks 34 and 35 are disengaged and the table lowered. The cope is then filled with mold material and the table raised to squeeze the cope mold against the squeeze head 58. The slides 16, 16 are then moved in the slideways 18, 18 to bring them into a position in which they will engage pins 14, 14. The bottom board clamp having been removed the table 12 is lowered so that it is supported by pins 14, 14 on slides 16, 16. In this position the cope 32 is suspended by hooks 34 and 35 at a distance above the drag 70 and with the cope mold held in the cope by retaining slide well known in the art. The pattern is then stripped from the drag 70, the table 12 again raised to bring the cope to rest on the drag and the cope mold retaining slides moved to release the cope mold from the cope. At this point the drag may or may not as desired be clamped to the cope according to whether or not the drag is to be used with a cope cover or a whole mold cover is to be used for pouring in manners well known in the art.

The slides 16, 16 are moved to permit the lowering of the table and the table together with the bottom board and the mold, with or without the drag are lowered to strip the mold from the cope or from the cope and drag. The board and mold are then removed and the machine is ready for the making of another mold.

Rod 52 and squeeze head 58 are moved into and out of operating position as required by rotation thereof on ring 48 about post 5.

I claim:

1. In a mold making machine, in combination, a mold flask, a standard, a device rotatable and vertically movable on said standard and attached to said flask, said flask being rotatable about a horizontal axis with respect to said device, means for moving the flask upward, means for suspending the flask above said moving means, and a squeeze head above the flask and means for rotating said squeeze head from over said table.

2. In a mold making machine, in combination, a mold flask, a standard, a device rotatable and vertically movable on said standard and attached to said flask, said flask being rotatable about a horizontal axis with respect to said device, means for moving the flask upward, means for suspending the flask above said moving means, a squeeze head rotatably mounted on said support and over said moving means, and a disengageable rod for securing said squeeze head at a point outside said support.

3. In a mold making machine, in combination, a mold flask, a standard, a device vertically movable on said standard and attached to said flask, said flask being rotatable about a horizontal axis with respect to said device, means for moving the flask upward, means for suspending the flask above said moving means, means for holding said moving means in moved up position at a predetermined distance below the suspended position of said flask, a squeeze head above the flask and means for rotating said squeeze head from over said table.

4. In a mold making machine, in combination, a mold flask, a standard, a device vertically movable on said standard and attached to said flask, said flask being rotatable about a horizontal axis with respect to said device, means for moving the flask upward, means for suspending the flask above said moving means, means for holding said moving means in moved up position at a predetermined distance below the suspended position of said flask, a squeeze head rotatably mounted on said support and over said moving means, and a disengageable rod for securing said squeeze head at a point outside said support.

5. In a mold making machine, in combination, a mold flask, a standard, a device rotatable and vertically movable on said standard and attached to said flask, said flask being rotatable about a horizontal axis with respect to said device, means for moving the flask upward, adjustable means for suspending the flask above said moving means, a squeeze head above the flask and means for rotating said squeeze head from over said table.

6. In a mold making machine, in combination, a mold flask, a standard, a device rotatable and vertically movable on said standard and attached to said flask, said flask being rotatable about a horizontal axis with respect to said device, means for moving the flask upward, adjustable means for suspending the flask above said moving means, a squeeze head rotatably mounted on said support and over said moving means, and a disengageable rod for securing said squeeze head at a point outside said support.

7. In a mold making machine, in combination, a cope flask having mold retaining slides and a drag mold, a standard, a device vertically movable on said standard and attached to said flask, said flask being rotatable about a horizontal axis with respect to said device, means for moving the flask upward, adjustable means for suspending the flask above said moving means, means for holding said moving means in moved up position at a predetermined distance below the suspended position of said flask, a squeeze head above the flask and means for rotating said squeeze head from over said table.

8. In a mold making machine, in combination, a cope flask having mold retaining slides and a drag mold, a standard, a device vertically movable on said standard and attached to said flask, said flask being rotatable about a horizontal axis with respect to said device, means for moving the flask upward, adjustable means for suspending the flask above said moving means, means for holding said moving means in moved up position at a predetermined distance below the suspended position of said flask, a squeeze head rotatably mounted on said support and over said moving means, and a disengageable rod for securing said squeeze head at a point outside said support.

In testimony whereof I hereto affix my signature.

JOHN R. WOOD.